United States Patent [19]

Chatterji et al.

[11] 3,900,070

[45] Aug. 19, 1975

[54] GELLING LIQUID HYDROCARBONS

[75] Inventors: Jiten Chatterji; Marlin D. Holtmyer; Robert L. Tiner, all of Duncan, Okla.

[73] Assignee: Halliburton Company, Duncan, Okla.

[22] Filed: May 6, 1974

[21] Appl. No.: 467,312

[52] U.S. Cl............................. 166/308; 252/8.55 R
[51] Int. Cl.²......................................... E21B 43/26
[58] Field of Search........ 166/271, 280, 283, 305 R, 166/308; 252/8.55 R

[56] References Cited
UNITED STATES PATENTS

| | | | |
|---|---|---|---|
| 2,596,844 | 5/1952 | Clark................................... | 166/283 |
| 2,675,354 | 4/1954 | Fast et al. ............................ | 252/316 |
| 2,718,462 | 9/1955 | Cohen.................................. | 44/7 A |
| 2,724,439 | 11/1955 | Brainerd............................. | 166/283 |
| 2,751,283 | 6/1956 | Van Strien et al............. | 252/8.55 R |
| 2,866,754 | 12/1958 | Cardwell et al................ | 252/8.55 R |
| 2,914,476 | 11/1959 | Alderman et al. ............. | 252/8.55 R |
| 2,966,457 | 12/1960 | Starmann et al................ | 252/8.55 R |
| 2,978,411 | 4/1961 | Leverberg et al..................... | 44/7 A |
| 3,406,115 | 10/1968 | White................................ | 252/8.55 R |
| 3,452,818 | 7/1969 | Gidley et al. ....................... | 166/308 |
| 3,757,864 | 9/1973 | Crawford et al.................... | 166/308 |
| 3,799,267 | 3/1974 | Ely et al.............................. | 166/308 |
| 3,846,310 | 11/1974 | Blackwell et al. ................. | 166/283 |

*Primary Examiner*—Stephen J. Novosad
*Assistant Examiner*—Jack E. Ebel
*Attorney, Agent, or Firm*—Thomas R. Weaver; Fred E. Hook; John H. Tregoning

[57] ABSTRACT

A method of gelling a liquid hydrocarbon wherein a gelling quantity of aluminum salt of 2-methyl pentanoic acid is mixed with the liquid hydrocarbon and the resulting mixture is agitated until the liquid hydrocarbon is gelled.

10 Claims, No Drawings

GELLING LIQUID HYDROCARBONS

Gelled liquid hydrocarbons are utilized in a variety of applications in the oil, chemical and related industries. Such gelled hydrocarbons are particularly suitable as fracturing fluids for treating subterranean formations in that they possess good friction loss characteristics, they support sand and other solid materials, and they are compatible with oil and gas producing formations.

Heretofore, liquid hydrocarbons have been gelled by combining quantities of aluminum salts of long chain fatty acids therewith. While such aluminum salts of long chain aliphatic acid have been utilized successfully for gelling liquid hydrocarbons, they are slow to dissolve in liquid hydrocarbons and the rate of gelation is extremely slow at atmospheric temperatures less than about 80°F. In order to increase the rate of gelation, it has heretofore been necessary to heat the liquid hydrocarbon.

One of the most commonly used aluminum salt of long chain fatty acids is the aluminum salt of 2-ethyl hexoic acid. This aluminum salt is commercially available and produces a stable gelled liquid hydrocarbon.

The terms "gel" or "gelled" are used herein to mean a high viscosity fluid which is to be distinguished from simple thickened solutions prepared by dissolving thickening materials therein. The gelled liquid hydrocarbons generally remain thickened or viscous even though diluted. That is, when diluted the gel remains as a distinct phase in suspension.

It has now been found that a stable gelled liquid hydrocarbon can be formed by mixing a gelling quantity of aluminum salt of 2-methyl pentanoic acid with liquid hydrocarbon and agitating the resulting mixture until the liquid hydrocarbon is gelled, and that a stable gelled liquid hydrocarbon can be formed at a faster rate, than with the use of the aluminum salt of 2-methyl pentanoic acid, when the gelled liquid hydrocarbon is formed by mixing a quantity of an oil soluble aliphatic carboxylic acid and a gelling quantity of aluminum salt of 2-methyl pentanoic acid with the liquid hydrocarbon and agitating the resulting mixture until the liquid hydrocarbon is gelled. The use of the aluminum salt of 2-methyl pentanoic acid overcomes some of the problems encountered with the use of the aluminum salt of 2-ethyl hexoic acid and higher molecular weight fatty acids. As a lower molecular weight fatty acid than 2-ethyl hexoic acid, 2-methyl pentanoic acid produces an aluminum salt which is more soluble in liquid hydrocarbons than the aluminum salts of 2-ethyl hexoic acid or of higher molecular weight long chain fatty acids. Additionally, the aluminum salt is useful as a gelling agent for low boiling point liquid hydrocarbons such as propane and butane, whereas the aluminum salt of 2-ethyl hexoic acid is not a suitable gelling agent for these low boiling point liquid hydrocarbons.

By one method of preparing the aluminum salt of 2-methyl pentanoic acid an aqueous solution comprising about three moles of sodium hydroxide and about two moles of 2-methyl pentanoic acid is reacted to form the sodium salt of 2-methyl pentanoic acid. The aqueous solution is heated to boiling to bring about completion of the reaction followed by the addition of about 1.1 moles of aluminum chloride hexahydrate resulting in the precipitation of the aluminum salt of 2-methyl pentanoic acid. The aluminum chloride hexahydrate is continuously added to the solution with boiling and vigorous agitation to form the aluminum salt of 2-methyl pentanoic acid. The solution is then cooled and filtered to remove the precipitated aluminum salt. The precipitate is washed with water and methanol followed by vacuum drying. It is thought that the aluminum salt of 2-methyl pentanoic acid produced by this procedure is predominantly the dialuminum salt; however, a portion of the aluminum salt can exist as the mono- and/or possibly the trialuminum salt of 2-methyl pentanoic acid.

Suitable liquid hydrocarbons for gelation with the aluminum salt of 2-methyl pentanoic acid include aliphatic and aromatic hydrocarbons and mixtures thereof. Examples of suitable liquid hydrocarbons include but are not limited to liquid paraffin hydrocarbons such as propane, n-butane, isobutane, n-hexane, n-octane, n-decane, n-tridecane, benzene, toluene, ethyl benzene, cyclohexane, gasoline, kerosene, lubricating oils, diesel oils, crude oils and mixtures thereof.

The aluminum salt of 2-methyl pentanoic acid is particularly suitable for gelling liquified petroleum gases, i.e., propane and butane in that rapid gelation of such hydrocarbons at ambient temperatures results.

Liquid hydrocarbon is gelled with the aluminum salt of 2-methyl pentanoic acid by adding a gelling quantity of the aluminum salt of 2-methyl pentanoic acid to the liquid hydrocarbon and agitating the resulting mixture until the gel is formed. With the aluminum salt of 2-methyl pentanoic acid, gelation of the liquid hydrocarbon is achieved at temperatures above about 50°F without heating the liquid hydrocarbon. A gelling quantity of the aluminum salt of 2-methyl pentanoic acid gelling agent, if used alone with the hydrocarbon liquid, is about 0.1 to about 2 and preferably about 0.25 to about one part by weight gelling agent per about 100 parts by weight liquid hydrocarbon. Some liquid hydrocarbon thickening is achieved when the gelling agent is added thereto in amounts below about 0.1 parts by weight gelling agent per 100 parts by weight liquid hydrocarbon. Liquid hydrocarbons are generally converted to essentially solid materials using amounts greater than about 2 parts by weight gelling agent per 100 parts by weight liquid hydrocarbon.

To increase the rate of gelation of the liquid hydrocarbon, a quantity of an oil soluble aliphatic carboxylic acid and a gelling quantity of the aluminum salt of 2-methyl pentanoic acid are mixed with the liquid hydrocarbon and the resulting mixture is agitated until the liquid hydrocarbon is gelled. Suitable such oil soluble aliphatic carboxylic acids have about 5 to about 25 and preferably about 5 to about 15 carbon atoms in the aliphatic chain. Examples of such oil soluble aliphatic carboxylic acids include but are not limited to 2-methyl butanoic acid, 3-methyl butanoic acid, 2-ethyl butanoic acid, 2,2-dimethyl butanoic acid, pentanoic acid, 2-methyl pentanoic acid, hexoic acid, 2-ethyl hexoic acid and mixtures thereof.

These oil soluble aliphatic carboxylic acids are mixed with the liquid hydrocarbon to increase the gelation rate of the aluminum salt of 2-methyl pentanoic acid at a quantity of about 0.05 to about 2 and preferably about 0.25 to about 1 part by weight oil soluble aliphatic carboxylic acid per 100 parts by weight liquid hydrocarbon. At concentrations below about 0.05 parts by weight oil soluble carboxylic acid per 100 parts by weight liquid hydrocarbon the rate of gelation is not significantly increased. As the concentration of oil soluble carboxylic acid is increased above the lower indicated concentrations the rate of gelation is increased; however, the oil soluble carboxylic acid has an adverse effect on the gel structure. Acids are known as breakers to destroy the gel structure. At concentrations of oil soluble carboxylic acid higher than the highest indicated concentration, the oil soluble carboxylic acid generally does not further increase the rate of gelation and generally causes the gel structure to break down at an accelerated rate.

In utilizing the aluminum salt of 2-methyl pentanoic acid to form gelled liquid hydrocarbons to be utilized as subterranean formation treating fluids, it is often desirable that the gelled agent hydrocarbon break or revert to a thin liquid after a period of time. In order to achieve this result, a gel breaker can be incorporated with the gelled hydrocarbon liquid. Acids and acid producing materials have been used as gel breakers and are satisfactory.

In preparing relatively large quantities of gelled liquid hydrocarbons such as the quantities required for carrying out fracturing and other treatments in subterranean formations, the liquid hydrocarbon is agitated and circulated through a blender. If a mixture of oil soluble carboxylic acid such as 2-methyl pentanoic acid and the aluminum salt of 2-methyl pentanoic acid is utilized as the gelling agent, the acid and aluminum salt are added to the liquid hydrocarbon. After addition of the acid and aluminum salt, the circulation and agitation of the liquid hydrocarbon is continued until the desired gel is formed. At ambient temperatures generally encountered, i.e., temperatures in the range of from about 50°F to about 100°F, the gel forms in 15 to 30 minutes. If a gel breaker, propping agent and/or other additives are incorporated in the gel, they are added to the hydrocarbon liquid after the liquid hydrocarbon has been gelled.

EXAMPLE 1

The aluminum salt of 2-methyl pentanoic acid is prepared by combining about three moles of sodium hydroxide in the form of a 25% by weight aqueous solution with about two moles of 2-methyl pentanoic acid. The resulting mixture is heated to boiling so that the sodium salt of the acid is formed. The resulting solution is next reacted with about 1.1 moles of aluminum chloride hexahydrate to form the aluminum salt of 2-methyl pentanoic acid as a solid precipitate. The precipitated aluminum salt is purified by boiling with methanol and then drying in a vacuum oven.

EXAMPLE 2

The gelation rate of the aluminum salts of 2-methyl pentanoic acid and 2-ethyl hexoic acid are compared on Table I. The test samples are prepared by mixing about 0.06 parts by weight aluminum salt and about 0.03 parts by weight 2-methyl pentanoic acid with about 100 parts by weight kerosene, maintaining the resulting mixtures at 60°F, and measuring the viscosity of the resulting mixtures with a Brookfield Viscometer at the times indicated on Table I. The tests shown on Table I indicate that the aluminum salt of 2-methyl pentanoic acid gels kerosene at a faster rate than the aluminum salt of 2-ethyl hexoic acid.

TABLE I

RATES OF GALATION AND VISCOSITIES OF VARIOUS GELLING AGENT-KEROSENE MIXTURES

| Gelling Agent | Time After Mixing Gelling Agent With Kerosene, Minutes | Viscosity of Mixture, cps |
| --- | --- | --- |
| Aluminum salt of 2-methyl pentanoic acid | 25 | 75 |
|  | 60 | 1125 |
|  | 90 | 5000 |
| Aluminum salt of 2-ethyl hexoic acid | 25 | gel not formed |
|  | 60 | gel not formed |
|  | 90 | 300 |

EXAMPLE 3

The gelation of propane with the aluminum salt of 2-methyl pentanoic acid prepared by the procedure described in Example 1 is tested in a high pressure cell equipped with a mechanical stirring device and a sight glass. To the cell is added about 200 milliliters of liquid propane, about 0.3 parts by weight 2-methyl pentanoic acid per 100 parts by weight propane, and about one part by weight of the aluminum salt of 2-methyl pentanoic acid. The liquid propane mixture is agitated while maintaining the liquid propane mixture under a pressure of about 100 pounds per square inch and at a temperature of about 80°F. A viscous gel is formed in less than four minutes after mixing the aluminum salt of 2-methyl pentanoic acid with the liquid propane.

EXAMPLE 4

The gelation of propane with the aluminum salt of 2-ethyl hexoic acid is tested in a high pressure cell by the procedure described in Example 3. To the cell is added about 200 milliliters of liquid propane, about 0.3 part by weight 2-ethyl hexoic acid per 100 parts by weight liquid propane and about one part by weight of the aluminum salt of 2-ethyl hexoic acid per 100 parts by weight liquid propane. After agitating this liquid propane mixture for about ten hours there was no indication of gelation of the liquid hydrocarbon.

EXAMPLE 5

The aluminum salt of propionic acid, 2-methyl propionic acid, 2,2-dimethyl propionic acid, butanoic acid, 2-methyl butanoic acid, 3-methyl butanoic acid, 2-ethyl butanoic acid, 2,2-dimethyl butanoic acid, pentanoic acid, 2-methyl pentanoic acid and hexoic acid are prepared and homogeneously mixed with kerosene at the concentration of about 0.6 parts by weight aluminum salt per 100 parts by weight kerosene. The gelation of the kerosene is observed with the aluminum salt of 2-methyl pentanoic acid being the only aluminum salt forming a satisfactory gel.

These aluminum salts are prepared in a 4-liter reaction flask with 1500 milliliters of water being added to the flask and heated to 140°F. After heating to 140°F, two moles of the aliphatic carboxylic acid is added to the water. Thirty grams of sodium hydroxide dissolved in 30 milliliters of water is then added to the reaction flask. The mixture is then maintained at 140°F and stirred for 30 minutes to react the sodium hydroxide with the aliphatic carboxylic acid. 1.1 moles of aluminum chloride hexahydrate dissolved in 500 milliliters of water is then added to the reaction flask. The resulting mixture is then refluxed for 30 minutes to precipitate the aluminum salt of the aliphatic carboxylic acid. The mixture is allowed to cool and is vacuum filtered to remove the aluminum salt. The aluminum salt is then boiled in methanol, filtered and dried before addition to kerosene.

Many uses for the aluminum salt of 2-methyl pentanoic acid as a gelling agent for liquid hydrocarbons will be apparent and is limited only as indicated in the claims.

What is claimed is:

1. The method of fracturing a subterranean formation which comprises the steps of:
   a. contacting the subterranean formation with a liquid at a sufficient pressure to fracture the subterranean formation;
   b. injecting the liquid into said fracture at a sufficient rate to open said fracture to a sufficient width to accept a gelled liquid hydrocarbon;
   c. injecting said gelled liquid hydrocarbon into said fracture at a sufficient rate to extend said fracture into the subterranean formation; and
   d. reducing the rate of injecting said gelled liquid hydrocarbon into said fracture to below the rate required for holding said fracture open, thereby permitting said fracture to close on said gelled liquid hydrocarbon;

wherein said gelled liquid hydrocarbon comprises a mixture of oil soluble aliphatic carboxylic acids selected from those having about 5 to 8 carbon atoms and mixtures thereof, a gelling quantity of an aluminum salt of 2-methyl pentanoic acid, and a liquid hydrocarbon.

2. The method of claim 1 wherein said gelling quantity of said aluminum salt is in the range of from about 0.1 to about 2 parts by weight of said aluminum salt per 100 parts by weight of said liquid hydrocarbon.

3. The method of claim 2 wherein said oil soluble aliphatic carboxylic acid is present in said gelled liquid hydrocarbon in the range of from about 0.05 to about 2 parts by weight per 100 parts by weight of said liquid hydrocarbon.

4. The method of claim 3 wherein said oil soluble aliphatic carboxylic acids are selected from the group consisting of 2-methyl butanoic acid, 3-methyl butanoic acid, 2-ethyl butanoic acid, 2,2-dimethyl butanoic acid, pentanoic acid, 2-methyl pentanoic acid, hexoic acid, 2-ethyl hexoic acid, and mixtures thereof.

5. The method of claim 4 wherein said gelling quantity of said aluminum salt is in the range of from about 0.25 to about 1 part by weight of said aluminum salt per 100 parts by weight of said liquid hydrocarbon.

6. The method of claim 5 wherein the concentration of said oil soluble aliphatic carboxylic acid is in the range of from about 0.25 to about 1 part by weight per 100 parts by weight of said liquid hydrocarbon.

7. The method of claim 6 wherein said liquid hydrocarbon is selected from aliphatic and aromatic hydrocarbons and mixtures thereof.

8. The method of claim 6 wherein said liquid hydrocarbon is selected from propane, n-butane, isobutane, n-hexane, n-octane, n-decane, n-tridecane, benzene, toluene, ethyl benzene, cyclohexane, gasoline, kerosene, lubricating oils, diesel oils, crude oils and mixtures thereof.

9. The method of claim 8 wherein said oil soluble aliphatic carboxylic acid is 2-methyl pentanoic acid.

10. The method of claim 9 wherein said liquid hydrocarbon is selected from kerosene, propane and butane.

* * * * *